US010340589B2

(12) United States Patent
Elmerick et al.

(10) Patent No.: US 10,340,589 B2
(45) Date of Patent: Jul. 2, 2019

(54) CAPACITIVELY COUPLED EXTERNAL ANTENNA SYSTEM AND METHOD FOR ELECTRIC METERS

(71) Applicant: Aclara Technologies LLC, St. Louis, MO (US)

(72) Inventors: Timothy P. Elmerick, Bedford, OH (US); Lawrence Robert Foore, Bay Village, OH (US)

(73) Assignee: Aclara Technologies LLC, St. Louis, MO (US)

(*) Notice: Subject to any disclaimer, the term of this patent is extended or adjusted under 35 U.S.C. 154(b) by 0 days.

(21) Appl. No.: 15/618,310

(22) Filed: Jun. 9, 2017

(65) Prior Publication Data

US 2017/0358856 A1 Dec. 14, 2017

Related U.S. Application Data

(60) Provisional application No. 62/348,359, filed on Jun. 10, 2016.

(51) Int. Cl.
*H01Q 9/16* (2006.01)
*H01Q 9/20* (2006.01)
*H01Q 1/22* (2006.01)
*H01Q 9/28* (2006.01)
*H01Q 1/42* (2006.01)
*H04Q 9/00* (2006.01)

(52) U.S. Cl.
CPC .......... *H01Q 1/42* (2013.01); *H04Q 9/00* (2013.01); *H04Q 2209/40* (2013.01); *H04Q 2209/60* (2013.01)

(58) Field of Classification Search
None
See application file for complete search history.

(56) References Cited

U.S. PATENT DOCUMENTS

| 3,059,849 A | 10/1962 | Saltzman |
| 3,705,385 A | 12/1972 | Batz |
| 3,754,250 A | 8/1973 | Bruner |
| 3,913,400 A | 10/1975 | Floren |
| 3,956,740 A | 5/1976 | Jones et al. |

(Continued)

OTHER PUBLICATIONS

Iskander, Magdy F., Electromagnetic Fields and Waves, 2013, Waveland Press, Inc, Second Edition, pp. 797-801.*

(Continued)

*Primary Examiner* — Muhammad N Edun
*Assistant Examiner* — Jerold B Murphy
(74) *Attorney, Agent, or Firm* — Stinson LLP

(57) ABSTRACT

An antenna system for a meter and/or other communication device, including a capacitive electric field source and an external antenna element. The capacitive electric field source is positioned within a dielectric cover and is electrically connected to an output port of a transceiver for forming an electric field indicative of the output signal. The external antenna element is separated from the capacitive electric field source by the dielectric cover and is configured for capacitively coupling to the capacitive electric field source and radiating electromagnetic radiation indicative of the output signal. The external antenna element then efficiently radiates and receives electromagnetic waves for wireless communications.

20 Claims, 9 Drawing Sheets

(56) References Cited

U.S. PATENT DOCUMENTS

| | | |
|---|---|---|
| 4,085,287 A | 4/1978 | Kullmann et al. |
| 4,350,980 A | 9/1982 | Ward |
| 4,361,877 A | 11/1982 | Dyer et al. |
| 4,396,915 A | 8/1983 | Farnsworth et al. |
| 4,399,510 A | 8/1983 | Hicks |
| 4,467,434 A | 8/1984 | Hurley et al. |
| 4,608,563 A | 8/1986 | Hoffman |
| 4,654,662 A | 3/1987 | Van Orsdel |
| 4,660,035 A | 4/1987 | Hoffman |
| 4,737,797 A | 4/1988 | Siwiak et al. |
| 4,744,004 A | 5/1988 | Hammond |
| 4,795,974 A | 1/1989 | Landman et al. |
| 4,804,957 A | 2/1989 | Selph et al. |
| 4,884,021 A | 11/1989 | Hammond et al. |
| 4,904,995 A | 2/1990 | Bonner et al. |
| 4,998,102 A | 3/1991 | Wyler et al. |
| 5,014,213 A | 5/1991 | Edwards et al. |
| 5,111,407 A | 5/1992 | Galpern |
| 5,122,735 A | 6/1992 | Porter et al. |
| 5,229,713 A | 7/1993 | Bullock et al. |
| 5,253,151 A | 10/1993 | Mepham et al. |
| 5,270,639 A | 12/1993 | Moore |
| 5,298,894 A | 3/1994 | Cerny et al. |
| 5,541,589 A | 7/1996 | Delaney |
| 5,553,094 A | 9/1996 | Johnson et al. |
| 5,583,492 A | 12/1996 | Nakanishi et al. |
| 5,621,419 A | 4/1997 | Meek et al. |
| 5,627,759 A | 5/1997 | Bearden et al. |
| 5,659,300 A | 8/1997 | Dresselhuys et al. |
| 5,801,643 A | 9/1998 | Williams et al. |
| 5,825,303 A | 10/1998 | Bloss, Jr. et al. |
| 5,847,683 A | 12/1998 | Wolfe et al. |
| 5,877,703 A | 3/1999 | Bloss, Jr. et al. |
| 5,898,370 A | 4/1999 | Reymond |
| 5,966,010 A | 10/1999 | Loy et al. |
| 5,986,574 A | 11/1999 | Colton |
| 6,014,089 A | 1/2000 | Tracy et al. |
| 6,067,052 A | 5/2000 | Rawles et al. |
| 6,078,785 A | 6/2000 | Bush |
| 6,181,294 B1 | 1/2001 | Porter et al. |
| 6,246,677 B1 * | 6/2001 | Nap ............ G01D 4/004 340/870.02 |
| 6,291,985 B1 | 9/2001 | Bush |
| 6,411,219 B1 | 6/2002 | Slater |
| 6,903,699 B2 | 6/2005 | Porter et al. |
| 7,385,524 B1 | 6/2008 | Orlosky |
| 8,126,665 B1 | 2/2012 | Whitson |
| 9,118,095 B2 | 8/2015 | Smith |
| 2001/0007444 A1 | 7/2001 | Porter et al. |
| 2004/0023638 A1 | 2/2004 | Reading |
| 2011/0006911 A1 | 1/2011 | Wilbur et al. |
| 2011/0115678 A1 | 5/2011 | Owens |
| 2012/0256808 A1 | 10/2012 | Owens |
| 2013/0057367 A1 * | 3/2013 | Smith ............ H01P 5/02 333/24 C |
| 2013/0080081 A1 | 3/2013 | Dugger et al. |
| 2014/0022134 A1 | 1/2014 | Owens |
| 2014/0236508 A1 * | 8/2014 | McGowan ...... G01R 21/133 702/62 |
| 2014/0292531 A1 | 10/2014 | Whitson, Jr. |
| 2014/0292532 A1 | 10/2014 | Whitson, Jr. |
| 2015/0138028 A1 | 5/2015 | Owens |

OTHER PUBLICATIONS

International Search Report and Written Opinion of related application PCT/US2017/36685 dated Aug. 24, 2017, 6 pages.
3M Adhesive Transfer Tapes with Adhesive 350, Technical Data: Sep. 2002, 5 pages.
Sheldahl G1860 Product Bulletin—Flexbase Copper Polyimide Laminate (date unknown), 2 pages.
Sheldahl T9017 Product Bulletin—Non-Flame Retardant Medium Flow Adhesive on Polyimide Film (date unknown), 2 pages.

* cited by examiner

US 10,340,589 B2

CAPACITIVELY COUPLED EXTERNAL ANTENNA SYSTEM AND METHOD FOR ELECTRIC METERS

CROSS-REFERENCE TO RELATED APPLICATION

This application claims priority to U.S. Provisional Patent Application Ser. No. 62/348,359 filed on Jun. 10, 2016, the disclosure of which is incorporated herein by reference in its entirety.

BACKGROUND

Electric meters in some forms include a modem and an antenna under a canopy (glass or plastic, typically referred to as "meter cover"). This places the antenna very close to the meter base, metrology, and other possible noise sources which are part of the meter's implementation.

SUMMARY

In one form, an antenna system of a meter includes an electric field source residing under a dielectric canopy in combination with an antenna element that resides outside of the dielectric canopy. The electric field source is electrically connected to a transceiver and forms an electric field indicative of an output signal of the transceiver. The antenna element is separated from the electric field source by the dielectric canopy and capacitively couples to the electric field source. The antenna element then efficiently radiates and receives electromagnetic waves for wireless communications.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
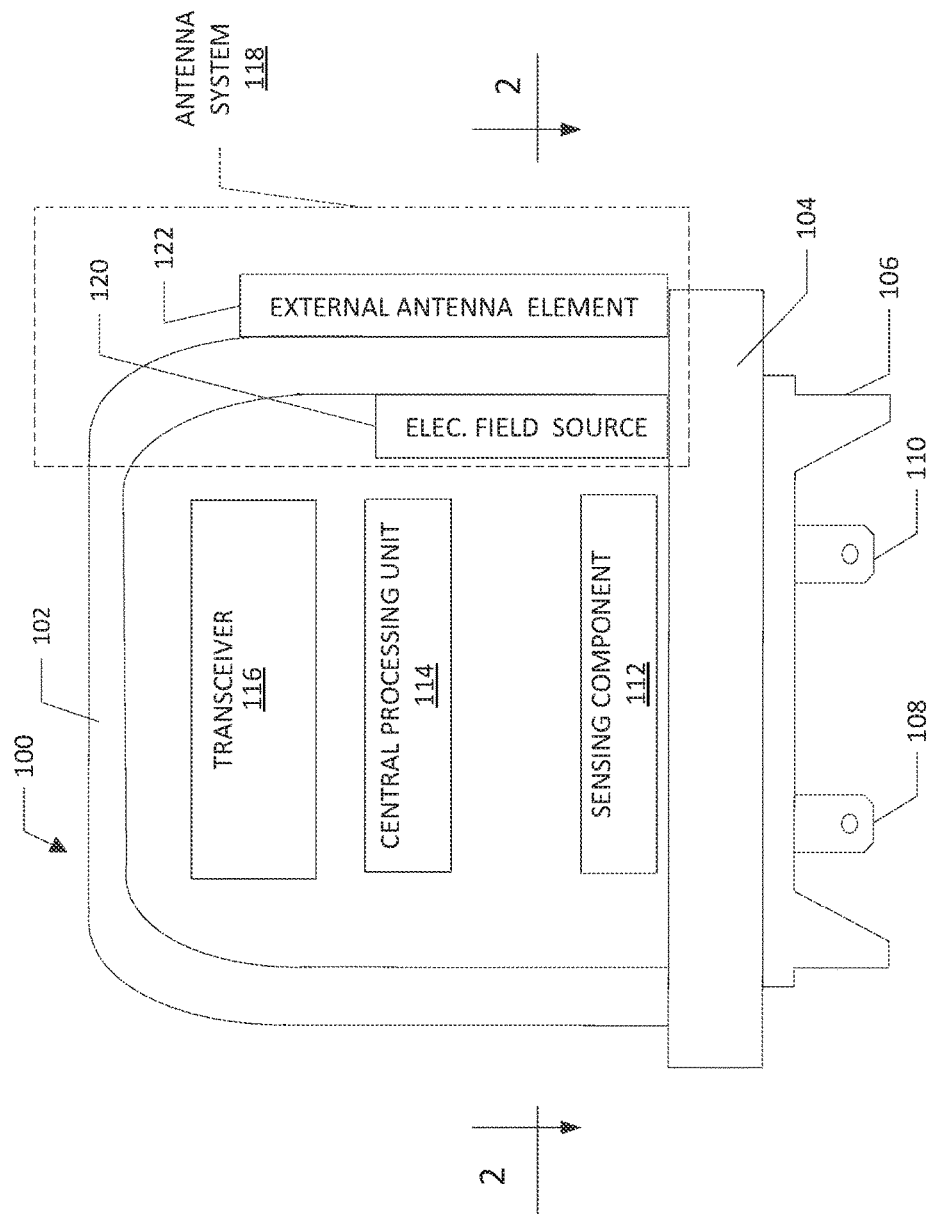
FIG. 1 is a side view partially in block diagram form of an electric meter according to one embodiment.

Referring to FIG. 1, a meter 100 includes a dielectric cover 102 attached to a meter base 104. The dielectric cover 102 has, for example, a cylindrical dome shape. It is contemplated that other geometrical shapes may be utilized for the dielectric cover 102. Extending outwardly from the meter base 104 is a mounting frame 106 and a pair of terminals 108, 110. The terminals 108, 110 complete the connection between the electric power line and the meter 100.

The meter 100 is powered directly from the electric power line flowing through terminals 108, 110 and into a power transformer (not shown) to provide the DC power required of the meter circuitry. The electrical power flowing through terminals 108 and 110 is sensed by a sensing component 112, such as a voltage transducer and/or current transducer. The sensing component 112 generates a measurement signal that corresponds an amount of a commodity (e.g., electricity) flowing through the meter 100. For example, when the meter 100 is an electrical meter, the commodity is electricity, the sensing component 112 senses at least one of power, current, and voltage of the electricity, and the measurement signal indicates at least one of watt hours, amperes, and volts. Although the meter 100 is described herein as an electrical meter, it is contemplated that the antenna system 118 can be used on other types of metering devices, such as gas and water meters, as well as other types of communication devices.

CPU

A central processing unit (CPU) 114 receives measurement signals from the transducers and processes the received measurement signal to generate a corresponding communication signal. The communication signal includes measurement data that corresponds to the amount of the commodity (e.g., electricity) flowing through the meter. For example, the output electrical measurement data generated by the CPU corresponds to kilowatt-hour usage and/or voltage, current, and frequency measurements. In other aspects, it is contemplated that the output electrical measurement data generated by the CPU may further include energy direction, time and date reporting, load profiling and failure reporting data.

Communication Transceiver

The communication transceiver 116 is coupled to the CPU 114 and transmits and receives signals wirelessly including the transmission of measurement data via the antenna system 118 according to the principles of the present invention. According to one aspect, the communication transceiver is, for example, an Aclara® Synergize™ MTU. It is contemplated that other commercially available or custom wireless communication circuits may be used in other aspects. In one embodiment of the present invention, the communication transceiver operates with a carrier frequency of between 450 to 470 megahertz with a bandwidth of about 20 megahertz. The principles of the system described herein are equally applicable to other carrier frequencies and other wireless networks. As explained in more detail below, the antenna system 118 includes a capacitive electric field source 120 and an external antenna element 122 that are capacitively coupled. Also as explained in more detail below, the external antenna element 122 in at least one form comprises two elements, a shorter element and a longer element. It is contemplated that the external antenna element 122 can comprise one element, two elements, or more than two elements without departing from the scope of the invention. As further explained below, the capacitive electric field source 120 in at least one form comprises two elements. In an embodiment, each element comprising the capacitive electric field source 120 corresponds to at least one element comprising the external antenna element 122.

Antenna System

Figure 2:
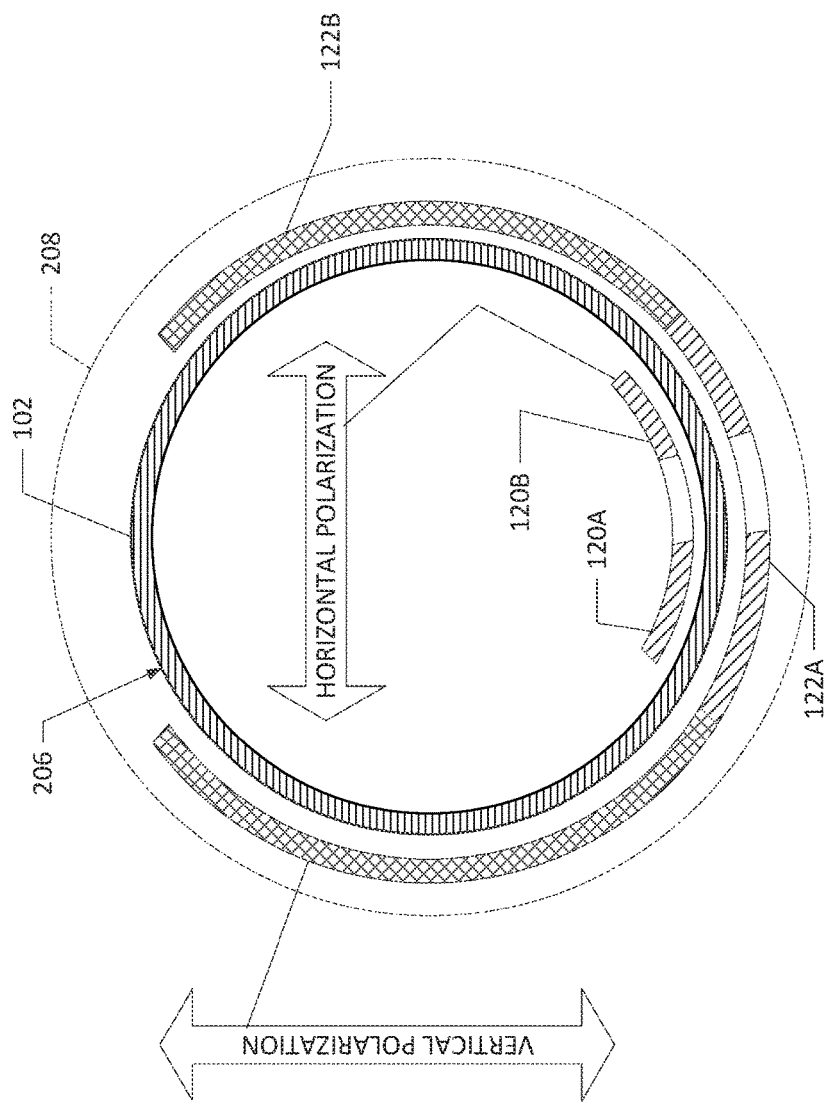
FIG. 2 is a partial, detailed, horizontal cross sectional view taken along lines 2-2 of FIG. 1 illustrating the capacitive electric field source 120, the external antenna element 122, and the dielectric cover 102 therebetween.

FIG. 2 is a partial, detailed, horizontal cross sectional view taken along lines 2-2 of FIG. 1. The antenna system 118 includes the capacitive electric field source 120 located under the dielectric cover 102 so that it is enclosed within the dielectric cover 102 and the meter base 104. In the illustrated embodiment, the capacitive electric field source 120 includes a first element 120A and a second element 120B. Each element of the capacitive electric field source 120 is electrically connected via a wired connection to an impedance matched output port of the transceiver 116 as controlled by the CPU 114. For example, the transceiver 116 can be connected to the capacitive electric field source 120 by U.FL coaxial cable or a waveguide. In an embodiment, the wired connection comprises at least a part of the capacitive electric field source 120. According to one aspect, the capacitive electric field source 120 is positioned to capacitively couple an electric field to an external antenna element 122 outside of the dielectric cover 102. In one form, the transceiver 116 also includes an input port connected to the capacitive electric field source 120 for receiving signals received by the external antenna element 122, such as interrogation and/or linking signals from a central station. The input and output ports can be the same port. The transceiver 116 is configured to provide an output signal at its output port including measurement data indicative of the communication signal from the CPU 114. The CPU 114 provides an electrical signal to the transceiver 116 which in turn provides a corresponding electrical signal to the antenna system 118, the external antenna element 122 of which transmits the corresponding electrical signal as electromagnetic radiation. In an embodiment, the CPU 114 matches an impedance of the antenna system 118 as a whole (e.g., capacitive electric field source 120, dielectric cover 102, and external antenna element 122).

In accordance with an aspect of the invention, the antenna system 118 comprises a capacitor. In an embodiment, the capacitive electric field source 120 comprises a first plate of the capacitor, the external antenna element 122 comprises a second plate of the capacitor, and the dielectric cover 102 comprises a dielectric medium of the capacitor. The capacitive electric field source 120 may be referred to as an interior plate of the capacitor and the external antenna element 122 may be referred to as an exterior plate of the capacitor in accordance with one or more embodiments of the invention. The wired connection (e.g., coaxial cable) feeds the capacitive electric field source 102 (i.e., interior plate) that capacitively couples to the external antenna element 122 (i.e., exterior plate) through the electric field that is set up in the dielectric medium of the dielectric cover 102. The capacitive coupling exists between the capacitive electric field source 102 (i.e., interior plate) and the corresponding area of the external antenna element 122 on the opposite side of the dielectric cover 102, as further described herein.

The energy that is transferred to the external antenna element 122 by the capacitive coupling sets up a current distribution in the rest of the antenna element 122 that allows it to resonate at desired frequencies and transmit electromagnetic radiation containing commodity measurement related information over a Commission (FCC) licensed wireless channel, such as 460 MHz, as provided by the output port of the transceiver 116. Since the electromagnetic field is capacitively coupled to the external antenna element 122, an internal antenna (i.e., an antenna located inside the cover) is not required. In an embodiment, the external antenna element 122 includes a ½ wavelength element in combination with a ¼ wavelength element. According to one aspect, the external antenna element 122 is positioned with respect to the capacitive electric field source 120 so that there is an impedance match to the capacitive electric field source 120 for maximum power transfer. The external antenna element 122 then efficiently radiates and receives electromagnetic waves for wireless communications.

In the embodiment illustrated by FIG. 2, the external antenna element 122 includes two elements (e.g., 122A and 122B) each including at least a capacitive coupling area and a current distribution area. The capacitive coupling area is directly opposite a corresponding capacitive electric field source 120. For example, the capacitive coupling area of external antenna element 122A is represented by the hatched portion that is directly opposite capacitive electric field source 120A, and the current distribution area of external antenna element 122A is represented by the remaining cross-hatched portion. In the illustrated embodiment, external antenna elements 122A, 122B are separated by a gap (e.g., the non-filled portions) adjacent the capacitive coupling areas. The capacitive electric field sources 120A, 120B are also separated by a gap. In one form, the gap between the capacitive electric field sources 120A, 120B is along a curved, longitudinal axis defined by sources 120A, 120B. In one form, the gap between the external antenna elements 122A, 122B is along a curved, longitudinal axis defined by elements 122A, 122B. In one form, the curved, longitudinal axis of the sources 120A, 120B is parallel to and adjacent to the curved, longitudinal axis of the elements 122A, 122B so that the gap of the capacitive electric field source 120 is parallel to and adjacent the gap of the external antenna element 122. It is also contemplated that the source 120 and element 122 can be mounted on a planar surface of the cover 102 in which case the longitudinal axes would be straight rather than curved.

In accordance with an aspect of the invention, capacitive electric field sources 120A, 120B are comprised of copper and each have a length of about one inch. In an embodiment, the length of capacitive electric field sources 120A, 120B is such that they create capacitive coupling with external antenna elements 122A, 122B and are unable to radiate electromagnetic magnetic waves at the wavelength received from the output port of transceiver 116 via the wired connection (e.g., coaxial cable). In other words, the capacitive electric field source 120 does not emit radiation that matches the impedance of air.

In one form, the external antenna element 122 is a conductive element, such as a metal strip. The external antenna element 122 is separated from the capacitive electric field source 120 by the dielectric cover 102. One purpose of the external antenna element 122 is to receive the electric radiation of the electric field, set up by a time-varying magnetic field, emitted by the capacitive electric field source 120 and emit corresponding electromagnetic radiation that matches the impedance of air. In an embodiment, the emitted electromagnetic radiation is polarized in the far field to match a receive antenna at the other end of the system. For example, when the receive antenna at the other end of the system is vertically polarized, the emitted electromagnetic radiation is likewise vertically polarized.

In one embodiment, the external antenna element 122 is positioned on an outer surface 206 of the dielectric cover 102, such as by an adhesive. Alternatively and in addition, an optional outer radio-transparent dome 208 can be positioned partially or completely over the external antenna element 122 and/or the dielectric cover 102 to provide protection from the environment. The figures including FIG. 2A are not to scale so that the spacing between the various components (i.e., the capacitive electric field source 120, the dielectric cover 102, the external antenna element 122, and/or the optional outer radio-transparent dome 208) is not illustrated and can be varied to facilitate tuning of the antenna system 118. The radiation pattern of the external antenna element 122 depends at least in part on both its separation from the capacitive electric field source 120 and on the dimensions of the external antenna element 122.

The capacitive electric field source 120 can vary in size as long as it is configured to effectively capacitively couple with the external antenna element 122. Similarly, the external antenna element 122 can vary in its dimensions depending on the frequency.

The antenna system 118 is scalable geometrically so that it can be employed in other bands, such as where mobile land radio systems would need a similar antenna, e.g., a first responder system. The invention supports electric meters in the Synergize™ RF Network (SRFN) product line. For example, the antenna system 118 can be configured to support an SRFN electric product roadmap transmitting and receiving in the range of 902-928 MHz, as well as other products and bandwidths.

Figure 3:
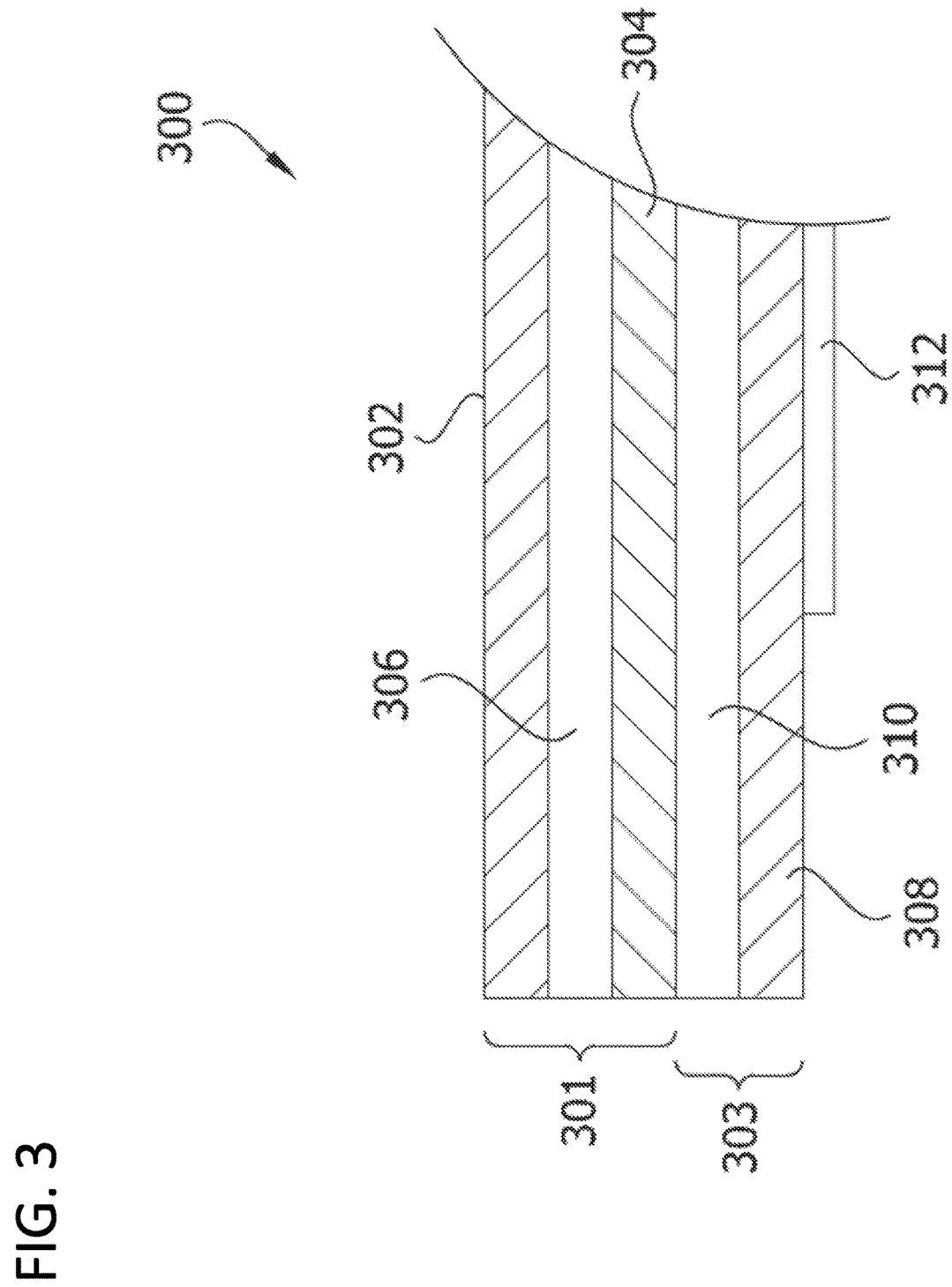
FIG. 3 is a partial cross-sectional view of one form of the capacitive electric field source 120 and/or one form of the external antenna element 122.

FIG. 3 is a partial cross-sectional view of one form of the capacitive electric field source 120 and/or one form of the external antenna element 122. Reference character 1 identifies a single sided copper clad laminate (e.g., Sheldahl™ Model G1860) comprising a first polyimide film 302 which is 2 Mil in thickness on one side of copper foil 304 joined by a first adhesive layer 306. The copper foil 304 is configured to form the longer external antenna element 122A and the shorter external antenna element 122B. Reference character 2 identifies a second laminate (Sheldahl™ T9017) comprising a second polyimide film 308, which is 2 Mil in thickness, adhered to the other side of the copper foil 304 by a second adhesive layer 310. In one form, the first polyimide film 302 and the second polyimide film 308 are the same shape. In one form, the copper foil 304 comprises a thickness of 25.4 micrometer (1 oz.). An adhesive 312, such as 3M® PSA™ Adhesive 9442, can be used to adhere the antenna element 300 to an external surface of a dome of a meter.

Pattern

Figure 4:
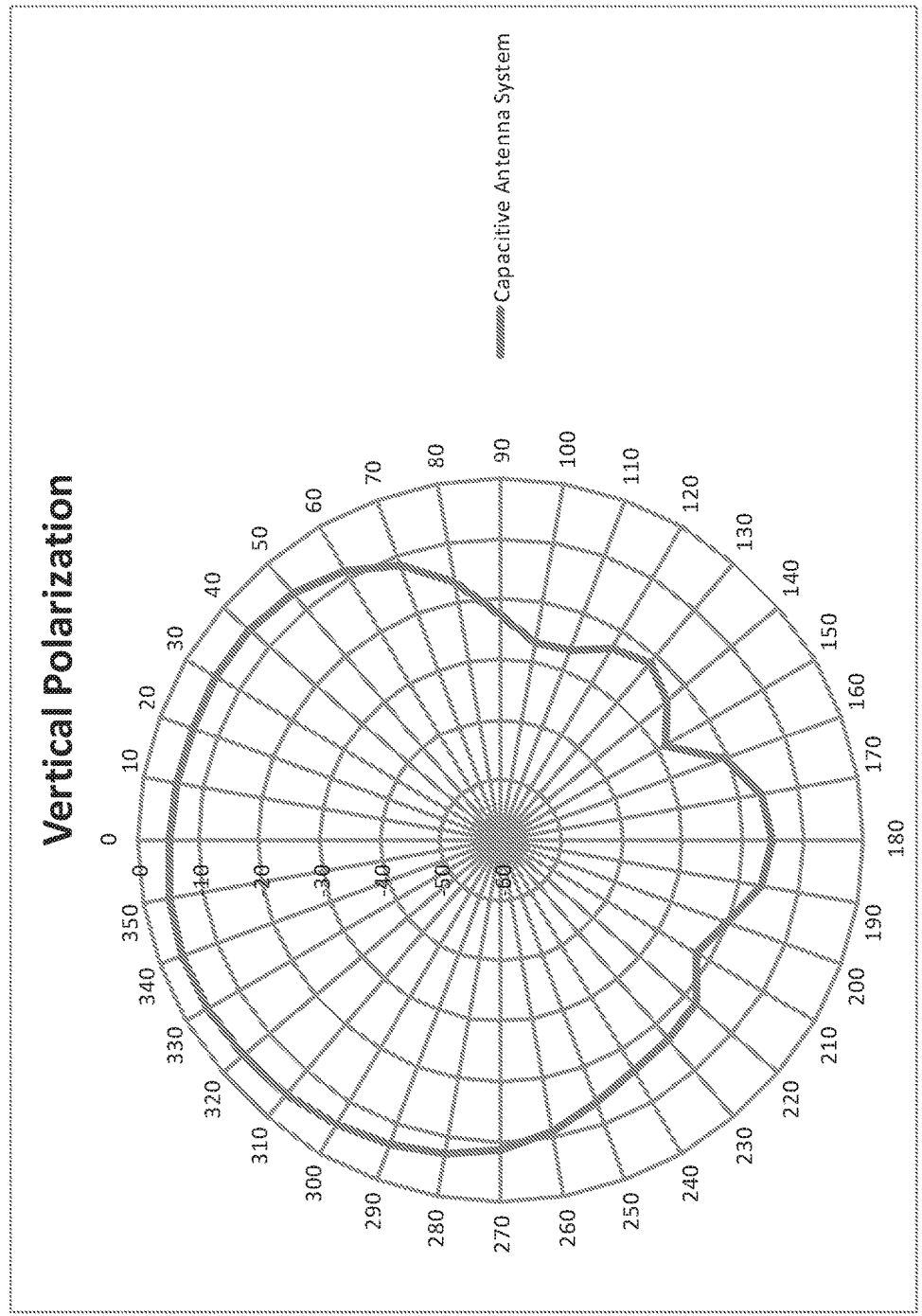
FIG. 4 illustrates a vertical polarization pattern of an antenna element in one form as described herein.

FIG. 4 illustrates a vertical polarization pattern of the external antenna element 122 in one form as described herein.

The following table summarizes radiation measurements in dB for the pattern illustrated in FIG. 4.

| Degrees | dB Capacitive Antenna System-V |
|---|---|
| 0 | −5.233 |
| 10 | −5.736 |
| 20 | −5.83 |
| 30 | −5.71 |
| 40 | −5.813 |
| 50 | −6.591 |
| 60 | −8.372 |
| 70 | −11.595 |
| 80 | −16.431 |
| 90 | −22.582 |
| 100 | −26.689 |
| 110 | −26.507 |
| 120 | −23.241 |
| 130 | −21.667 |
| 140 | −24.279 |
| 150 | −28.71 |
| 160 | −20.779 |
| 170 | −16.302 |
| 180 | −15.086 |
| 190 | −16.386 |
| 200 | −20.182 |
| 210 | −22.64 |
| 220 | −17.933 |
| 230 | −16.751 |
| 240 | −15.785 |
| 250 | −13.771 |
| 260 | −10.879 |
| 270 | −8.621 |
| 280 | −7.315 |
| 290 | −6.354 |
| 300 | −5.566 |
| 310 | −4.936 |
| 320 | −4.369 |
| 330 | −4.031 |
| 340 | −4.027 |
| 350 | −4.25 |
| 360 | −4.783 |

Coupling Area

In one form, the middle of the tuned structure of the external antenna element 122 can be positioned at the top, middle, or bottom of the dielectric meter cover 102 adjacent the capacitive electric field source 120. This is the electric field coupling area where the energy is transferred from the capacitive electric field source 120 to the external antenna element 122. The positions of the two elements are selected to provide maximum energy transfer. In general, there is usually no need for a balun circuit or other circuitry to transform the impedance and to balance the radiation transfer.

In one form, the external antenna element 122 is wrapped around the outside top of the dielectric meter cover 102 with the ends positioned at the top of the meter cover towards the meter face in order to direct the radiation away from the meter 100 and out in the desired direction.

Metering and Communications Devices

It is contemplated that the antenna system 118 can be configured for other metering devices and/or for communication devices. For example, when configured for a mobile device, the antenna system would be as follows, in one form. The dielectric cover 102 is configured as a dielectric substrate. The sensing component 112 is configured as a component generating a signal related to the mobile device (e.g., voice, data). The central processing unit (CPU) 114 receives the signal and generates a corresponding communication signal. The transceiver 116 is coupled to the CPU 114 and has an output port configured to provide an output signal including data indicative of the communication signal. The antenna system 118 includes the capacitive electric field source 120 and the external antenna element 122. The capacitive electric field source 120 is located within the dielectric substrate and electrically connected to the output port of the transceiver 116. The capacitive electric field source 120 is capacitively coupled to the external antenna element 122 for forming an electric field indicative of the output signal. The external antenna element 122 is located outside the dielectric substrate for radiating electromagnetic radiation indicative of the output signal. The external antenna element 122 is separated from the capacitive electric field source 120 by the dielectric substrate.

In one form, an existing meter can be reconfigured to use the antenna system 118. For example, the external antenna element 122 can be applied to an outer surface of the dome of an existing meter and capacitive electric field source 120 can be applied to an inner surface of the dome of the existing meter, although applying the external antenna element 122 replaces the function of any existing antenna within the dome. As another example, the capacitive electric field source 120 and the external antenna element 122 on a replacement dome can replace an existing dome of an existing meter, which also replaces the function of any existing antenna within the existing dome. In at least some existing meters, reconfiguring the meter to include the capacitive electric field source 120 and the external antenna element 122 will require other modifications to the meter, its electronics, and/or antenna.

Figure 5:
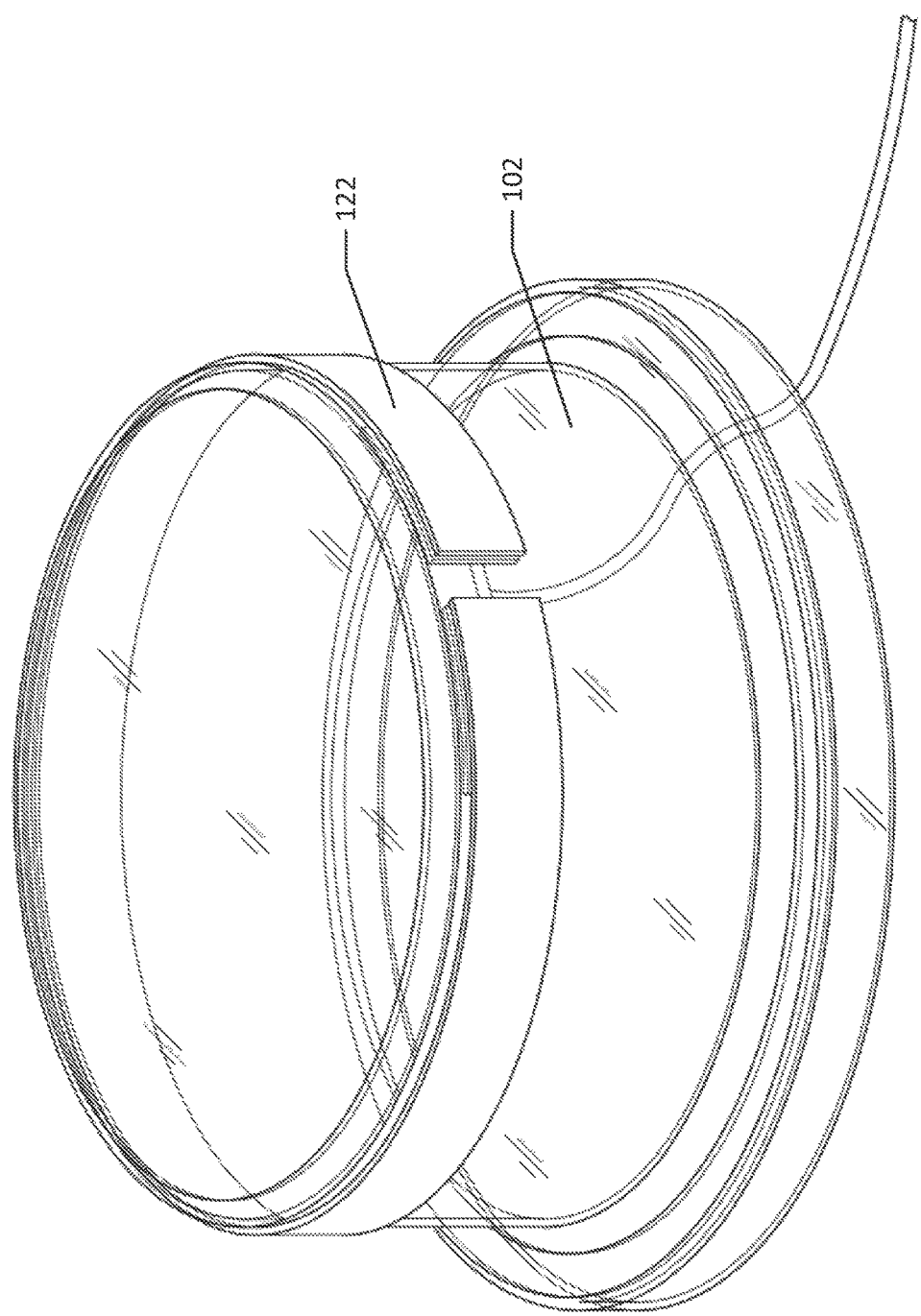
FIGS. 5 and 6 illustrate the capacitive electric field source 120, the external antenna element 122, and the dielectric cover 102 in one form as described herein.
Figure 6:
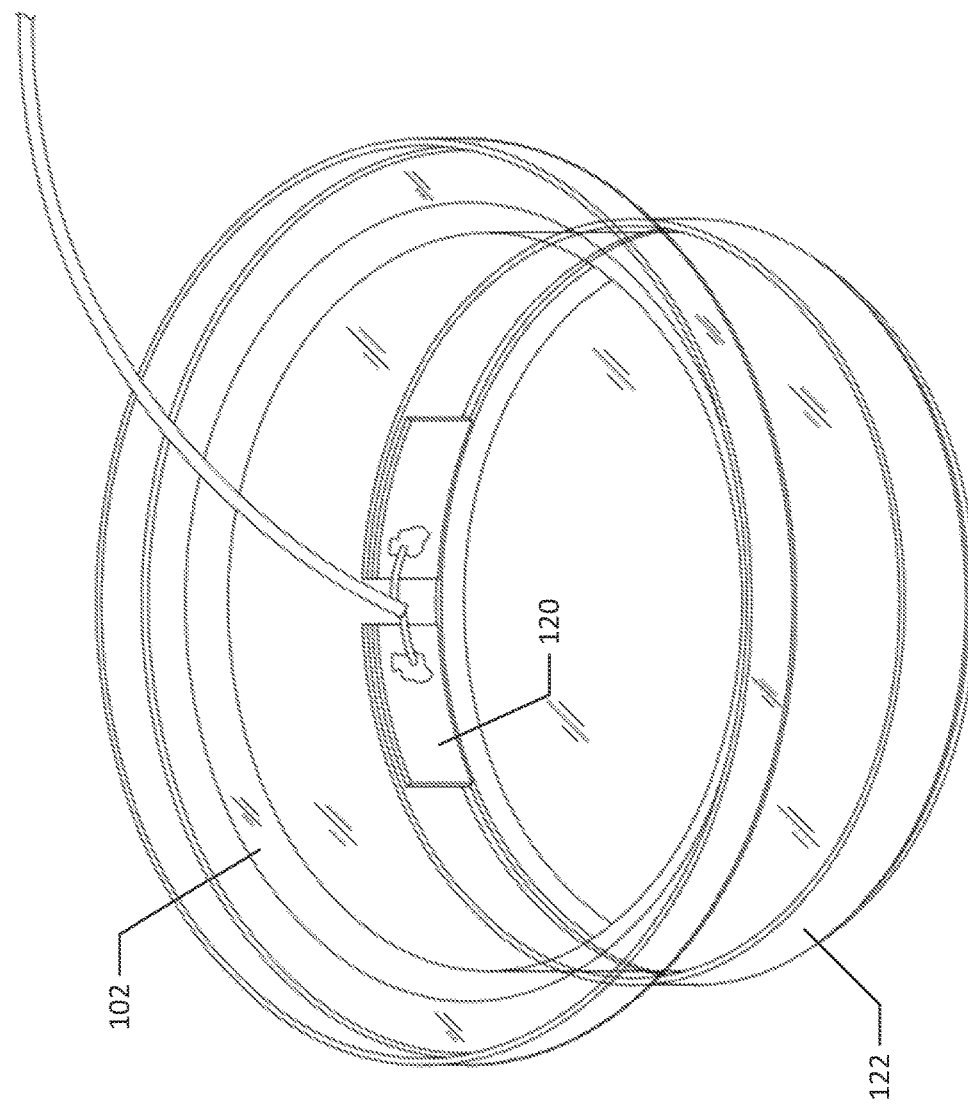

In one form, the antenna system 118 comprises the capacitive electric field source 120 and the external antenna element 122 made of strips of copper as shown in FIGS. 5 and 6. In one form, the external antenna element 122 comprises a flexible laminated circuit as shown in FIGS. 3, 5, and 6 which is configurable to take the shape of a dome. The reconfiguration of a meter to include the external antenna element 122 improves the overall transmission efficiency of the meter and, as a result, the shape and characteristics of the signal source become less significant.

Figure 7:
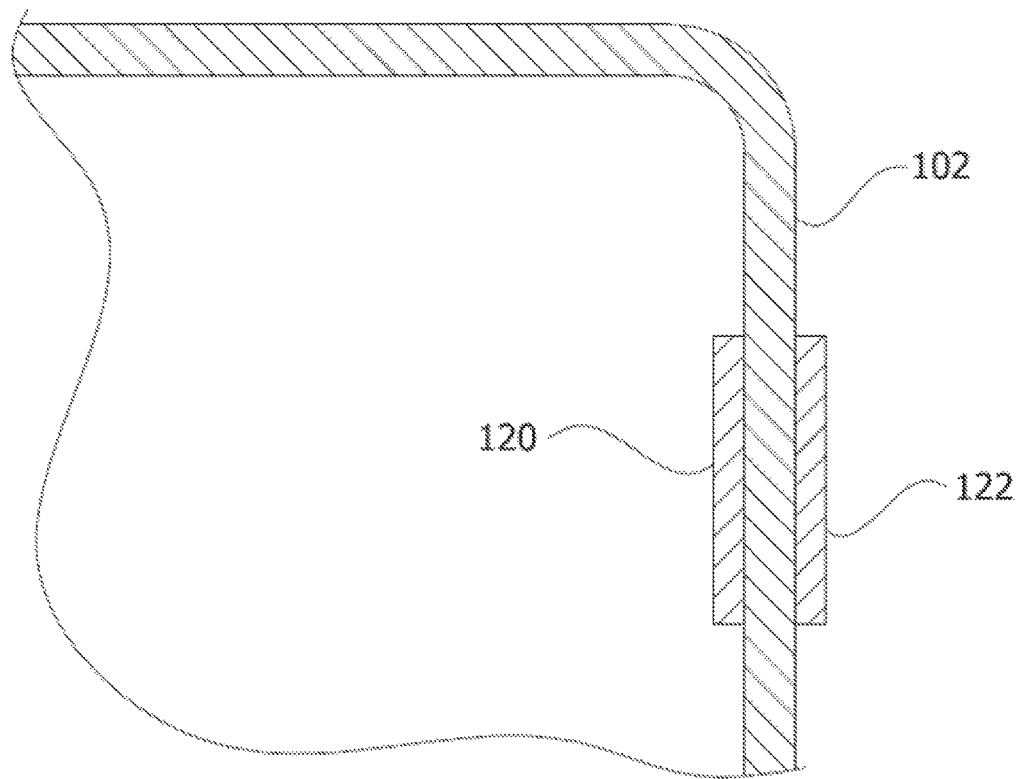
FIG. 7 is a partial, detailed, horizontal cross sectional view illustrating the capacitive electric field source 120, the external antenna element 122, and the dielectric cover 102 therebetween of FIGS. 5 and 6.

FIG. 7 is a partial, detailed, horizontal cross sectional view illustrating the capacitive electric field source 120, the external antenna element 122, and the dielectric cover 102 of the meter 100, in one form. As shown, the capacitive electric field source 120 is affixed to an interior surface of the dielectric cover 102 and the external antenna element is affixed to an exterior surface of the dielectric cover 102 opposite the capacitive electric field source 120. In most embodiments, the capacitance between the source 120 and the element 122 can vary without any significant difference in operation. Any standard, off-the-shelf cover 102 can provide capacitive coupling between the source 120 and the element 122. The extent of the coupling can depend, in part, on the desired radiation intensity produced by the element 122.

Figure 8:
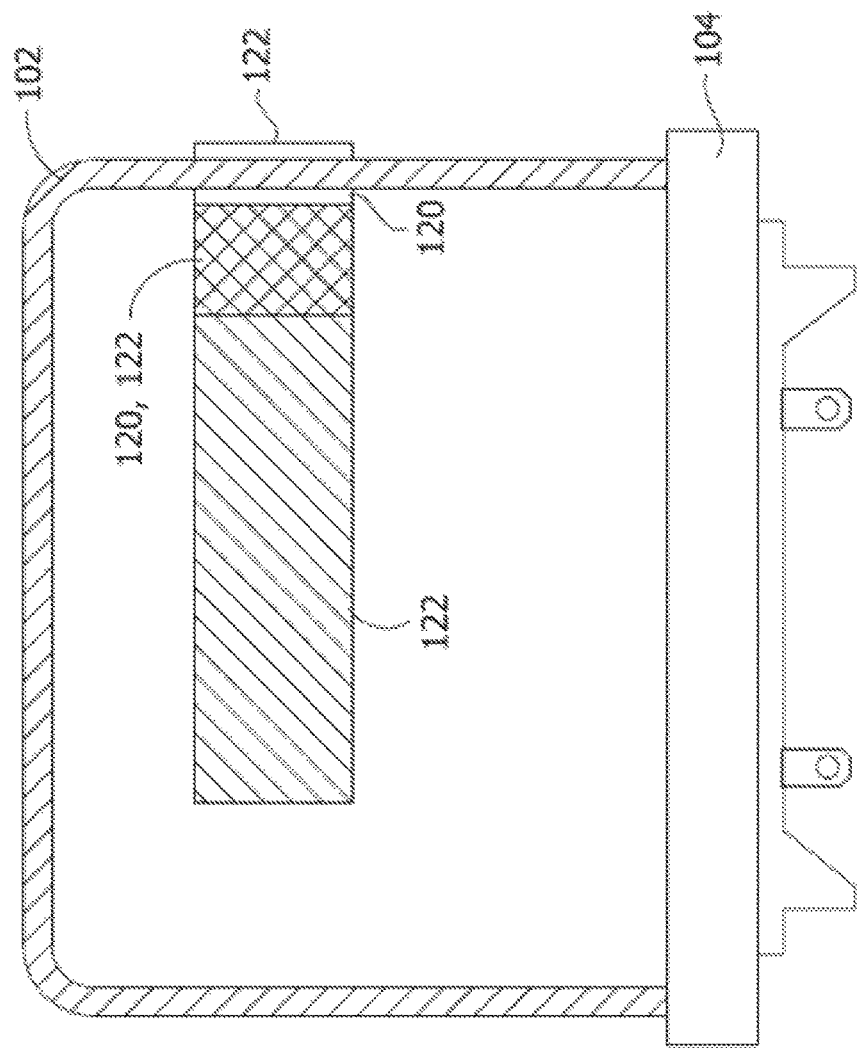
FIG. 8 is a detailed side view illustrating the base 104, the capacitive electric field source 120, the external antenna element 122, and the dielectric cover 102 therebetween of FIGS. 5 and 6.

FIG. 8 is a horizontal cross sectional view illustrating the base 104, the capacitive electric field source 120, the external antenna element 122, and the dielectric cover 102 of the meter 100, in one form. As illustrated, the capacitive electric field source 120 is affixed to an interior side surface of the dielectric cover 102 near a top portion of the dielectric cover 102, opposite where the dielectric cover 102 meets the base 104. The external antenna element 122 is affixed to an exterior side surface of the dielectric cover 102 near the top portion of the dielectric cover 102. As illustrated by the cross sectional view, the capacitive electric field source 120 and the external antenna element 122 overlap at the cross-hatched portion, and the external antenna element 122 extends beyond the capacitive electric field source 120 as further described herein.

Figure 9:
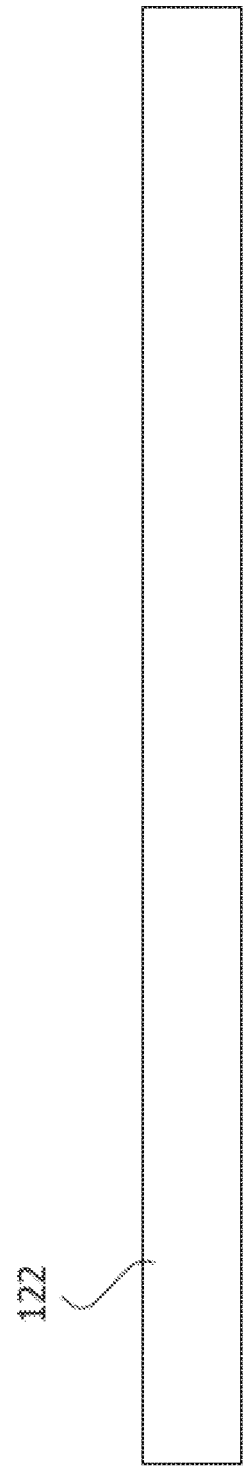
FIG. 9 is an illustration of a detailed plan view of an antenna element of FIGS. 5 and 6 in one form before being applied to a dielectric cover 102.

FIG. 9 is an illustration of a detailed plan view of the external antenna element 122 in one form before being applied to the dielectric cover 102. As illustrated, the external antenna element 122 is substantially rectangular before being applied to the dielectric cover 102, as further described herein.

EXAMPLES

In one form as illustrated in FIGS. 5-9, the electric field source 120 comprises a plurality of metallic planar strips 120A, 120B (e.g., 1 ounce copper or copper laminate) and the antenna element 122 comprises a plurality of metallic planar strips 122A, 122B (e.g., 1 ounce copper or copper laminate). A width of the electric field source strips 120A, 120B can be substantially equal to a width of the antenna element strips 122A, 122B, and a length of the electric field source strips 120A, 120B can be less than a length of the antenna element strips 122A, 122B. The electric field source strips 120A, 120B and the antenna element strips 122A, 122B can be generally rectangular.

In one form, the width of the electric field source strips 120A, 120B and the antenna element strips 122A, 122B can be substantially equal at about 0.5 inches, and the length of the electric field source strips 120A, 120B can be about 1.3 inches (e.g., ground side) to about 1.9 inches (e.g., feed side). The length of the antenna element strips 122A, 122B can be about 3.4 inches (e.g., feed side) to about 9.2 inches (e.g., ground side).

In one form, a ratio of the width of the antenna element strips 122A, 122B to the width of the electric field source strips 120A, 120B can be about 1:1.

In one form, a ratio of the length of the electric field source strips 120A, 120B to the width thereof can be about 2.6:1 to about 3.8:1, and a ratio of the length of the antenna element strips 122A, 122B to the width thereof can be about 6.8:1 to about 18.4:1.

In one form, a ratio of the length of the antenna element strips 122A, 122B to the length of the electric field source strips 120A, 120B can be about 1.79:1 to about 7.08:1.

In one form, a ratio of the length of the electric field source strips 120A, 120B to a circumference of the dielectric cover 102 can be about 0.07:1 to about 0.1:1 (e.g., the circumference of the dielectric cover being about 18.25 inches), and a ratio of the length of the antenna element strips 122A, 122B to the circumference of the dielectric cover can be about 0.186:1 to about 0.504:1.

In one form, a dielectric constant (e.g., relative permittivity) of the dielectric cover 102 can be about 2.8 to about 3.4. For example, the dielectric cover 102 may be comprised of polycarbonate.

In an embodiment, a meter in accordance with an aspect of the invention includes dielectric cover 102, sensing component 112, CPU 114, communication transceiver 116, and antenna system 118. The sensing component 112 is configured to generate a measurement signal representing an amount of a commodity and CPU 114 is configured to receive the measurement signal and generate a corresponding communication signal. The communication transceiver 116 is coupled to CPU 114 and has an output port configured to provide an output signal including measurement data indicative of the communication signal. The antenna system 118 includes the electric field source 120 and the external antenna element 122. The electric field source 120 is located within dielectric cover 102 and electrically connected to the output port of communication transceiver 116 for forming an electric field indicative of the output signal. The external antenna element 122 is separated from the electric field source 120 by dielectric cover 102 and configured to capacitively couple to the electric field source 120 and radiate electromagnetic radiation indicative of the output signal.

In one form, the communication transceiver 116 operates with a carrier frequency of between 450 and 470 MHz. Additionally or alternatively, the communication transceiver 116 transmits at a frequency of about 902 to 928 MHz and receives at a frequency of about 902 to 928 MHz. Additionally or alternatively, the communication transceiver 116 and antenna system 118 operate centered at 460 MHz with a bandwidth of about 20 MHz. Additionally or alternatively, the communication transceiver 116 and antenna system 118 operate centered at 915 MHz with a bandwidth of about 23 MHz.

In another form, the external antenna element 122 is magnetically isolated such that it is not inductively connected to any other elements (e.g., electric field source 120, etc.) of the meter.

In yet another form, the electromagnetic radiation radiated by the external antenna element 122 has a vertical polarization.

In another form, the external antenna element 122 is a tuned structure that includes a longer antenna element and a shorter antenna element. In this form, one end of the longer antenna element capacitively couples in a coupling area with the electric field source and the other end of the longer antenna element radiates electromagnetic radiation. In a further form, the shorter antenna element tunes the longer antenna element to a desired frequency and provides a radiation pattern that complements the longer antenna element in the radiation pattern.

In another form, the electric field source 120 includes a plurality of metallic planar strips and the external antenna element includes a plurality of metallic planar strips. In this form, a width of the electric field source strips is substantially equal to a width of the antenna element strips and a length of the electric field source strips is less than a length of the antenna element strips. In one form, the electric field source strips and the antenna element strips are generally rectangular. In another form, the width of the electric field source strips and the antenna element strips is about 0.5 inches, the length of the electric field source strips is about 1.3 inches to about 1.9 inches, and the length of the antenna element strips is about 3.4 inches to about 9.2 inches. In yet another form, a ratio of the width of the antenna element strips to the width of the electric field source strips is about 1:1. In another form, a ratio of the length to the width of the electric field source strips is about 2.6:1 to about 3.8:1, and a ratio of the length to the width of the antenna element strips is about 6.8:1 to about 18.4:1. In a further form, a ratio of the length of the antenna element strips to the length of the electric field source strips is about 1.79:1 to about 7.08:1. In another form, a ratio of the length of the electric field source strips to a circumference of the dielectric cover is about 0.07:1 to about 0.1:1, and a ratio of the length of the antenna element strips to the circumference of the dielectric cover is about 0.186:1 to about 0.504:1. In yet another form, a dielectric constant of the dielectric cover 102 is about 2.8 to about 3.4.

In another embodiment, an antenna system in accordance with an aspect of the invention includes a dielectric substrate (e.g., dielectric cover 102), a component (e.g., sensing component 112) configured to generate a signal, CPU 114, communication transceiver 116, and antenna system 118. The CPU 114 is configured to receive the signal generated by the component and generate a corresponding communication signal. The communication transceiver 116 is coupled to CPU 114 and has an output port configured to provide an output signal including data indicative of the communication signal. The antenna system 118 includes electric field source 120 and external antenna element 122. The electric field source 120 is located within the dielectric substrate and electrically connected to the output port of communication transceiver 116 for forming an electric field indicative of the output signal. The external antenna element 122 is separated from electric field source 120 by the dielectric substrate and configured to radiate electromagnetic radiation indicative of the output signal.

In one form, external antenna element 122 is magnetically isolated such that it is not inductively coupled to any other elements of the antenna system (e.g., electric field source 120, etc.).

In another form, external antenna element 122 comprises an active resonator, excited by the electric field from electric field source 120 and radiating electromagnetic radiation indicative thereof.

In another form, the electromagnetic radiation radiated by external antenna element 122 has a vertical polarization.

In yet another form, external antenna element 122 is a tuned structure that includes a longer antenna element and a shorter element. In this form, one end of the longer antenna element couples in a coupling area with the electric field source 120, and the other end of the longer antenna element 122 radiates electromagnetic radiation.

In another form, the shorter antenna element tunes the longer antenna element to a desired (e.g., predetermined) frequency and provides a radiation pattern that complements the longer antenna element in the radiation pattern.

In another form, a middle of a tuned structure of the external antenna element 122 is located at a bottom of the dielectric substrate adjacent to the electric field source 120 to form a coupling area for the electric field source and antenna elements.

In yet another form, the coupling area is where energy is transferred from the electric field source 120 to the external antenna element 122 and the coupling area has a size sufficient to create a capacitive coupling between the electric field source 120 and the antenna element 122.

In another form, the external antenna element 122 is on an outside surface of the dielectric substrate with the ends of the antenna element positioned at the top of the dielectric substrate (e.g., towards the meter face) to direct radiation out in a desired direction.

In another form, the antenna system is coupled to an electrical meter, the component generating the signal is a sensing component generating a measurement signal representing an amount of electricity, the sensing component senses at least one of power, current, and voltage of the electricity, and the communication signal is a measurement signal indicating at least one of watt-hours, amperes, and volts.

In another embodiment, a meter includes dielectric cover 102, sensing component 112, CPU 114, communication transceiver 116, and capacitive electric field source 120. The sensing component 112 is configured to generate a measurement signal representing an amount of a commodity measured by the meter. The CPU 114 is configured to receive the measurement signal and generate a corresponding communication signal. The communication transceiver 116 is coupled to CPU 114 and has an output port configured to provide an output signal including measurement data indicative of the communication signal. The electric field source 120 is located within dielectric cover 102 and electrically connected to the output port of communication transceiver 116 for forming an electric field indicative of the output signal. In one form, the improvement comprises a flexible antenna element (e.g., external antenna element 122) applied to an outer surface of dielectric cover 102 and separated from electric field source 120 by dielectric cover 102. The flexible antenna element is configured to capacitively couple to electric field source 120 and radiate electromagnetic radiation indicative of the output signal.

In yet another embodiment, a meter includes a dielectric cover, sensing component 112, CPU 114, communication transceiver 116, and a signal source. The sensing component 112 is configured to generate a measurement signal representing an amount of a commodity measured by the meter. The CPU 114 is configured to receive the measurement signal and generate a corresponding communication signal. The communication transceiver 116 is coupled to CPU 114 and has an output port configured to provide an output signal including measurement data indicative of the communication signal. The signal source is located within the dielectric cover and electrically connected to the output port of the communication transceiver 116 for radiating electromagnetic radiation indicative of the output signal. In one form, the improvement comprises a replacement dielectric cover (e.g., dielectric cover 102) that includes an electric field source element (e.g., capacitive electric field source 120) applied to an inner surface of the replacement dielectric cover, and a flexible antenna element (e.g., external antenna element 122) applied to an outer surface of the replacement dielectric cover for replacing the dielectric cover so that the antenna element is separated from the electric field source element by the replacement dielectric cover. Moreover, the electric field source element is configured to electrically connect to the output port of the communication transceiver 116 for forming an electric field indicative of the output signal, and the antenna element is configured to capacitively couple to the electric field source element and radiate electromagnetic radiation indicative of the output signal.

The Abstract and summary are provided to help the reader quickly ascertain the nature of the technical disclosure. They are submitted with the understanding that they will not be used to interpret or limit the scope or meaning of the claims. The summary is provided to introduce a selection of concepts in simplified form that are further described in the Detailed Description. The summary is not intended to identify key features or essential features of the claimed subject matter, nor is it intended to be used as an aid in determining the claimed subject matter.

For purposes of illustration, programs and other executable program components, such as the operating system, are illustrated herein as discrete blocks. It is recognized, however, that such programs and components reside at various times in different storage components of a computing device, and are executed by a data processor(s) of the device.

Although described in connection with an exemplary computing system environment, embodiments of the aspects of the invention are operational with numerous other special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well-known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the invention may be described in the general context of data and/or processor-executable instructions, such as program modules, stored one or more tangible, non-transitory storage media and executed by one or more processors or other devices. Generally, program modules include, but are not limited to, routines, programs, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments of the aspects of the invention may be implemented with processor-executable instructions. The processor-executable instructions may be organized into one or more processor-executable components or modules on a tangible processor readable storage medium which is not a signal. Aspects of the invention may be implemented with any number and organization of such components or modules. For example, aspects of the invention are not limited to the specific processor-executable instructions or the specific components or modules illustrated in the figures and described herein. Other embodiments of the aspects of the invention may include different processor-executable instructions or components having more or less functionality than illustrated and described herein.

The order of execution or performance of the operations in embodiments of the aspects of the invention illustrated and described herein is not essential, unless otherwise specified. That is, the operations may be performed in any order, unless otherwise specified, and embodiments of the aspects of the invention may include additional or fewer operations than those disclosed herein. For example, it is contemplated that executing or performing a particular operation before, contemporaneously with, or after another operation is within the scope of aspects of the invention.

All references, including without limitation all papers, publications, presentations, texts, reports, manuscripts, brochures, internet postings, journal articles, periodicals, and the like, cited in this specification are hereby incorporated by reference. The discussion of the references herein is intended merely to summarize the assertions made by their authors and no admission is made that any reference constitutes prior art. The inventors reserve the right to challenge the accuracy and pertinence of the cited references.

It is intended that all patentable subject matter disclosed herein be claimed and that no such patentable subject matter be dedicated to the public. Thus, it is intended that the claims be read broadly in light of that intent. In addition, unless it is otherwise clear to the contrary from the context, it is intended that all references to "a" and "an" and subsequent corresponding references to "the" referring back to the antecedent basis denoted by "a" or "an" are to be read broadly in the sense of "at least one." Similarly, unless it is otherwise clear to the contrary from the context, the word "or," when used with respect to alternative named elements is intended to be read broadly to mean, in the alternative, any one of the named elements, any subset of the named elements or all of the named elements.

In view of the above, it will be seen that several advantages of the aspects of the invention are achieved and other advantageous results may be attained.

Not all of the depicted components illustrated or described may be required. In addition, some implementations and embodiments may include additional components.

Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the aspects of the invention by way of example and not by way of limitation. This description enables one skilled in the art to make and use the aspects of the invention, and describes several embodiments, adaptations, variations, alternatives and uses of the aspects of the invention, including what is presently believed to be the best mode of carrying out the aspects of the invention. Additionally, it is to be understood that the aspects of the invention is not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

Having described aspects of the invention in detail, it will be apparent that modifications and variations are possible without departing from the scope of the invention as defined in the appended claims. It is contemplated that various changes could be made in the above constructions, products, and methods without departing from the scope of aspects of the invention. In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A meter comprising:
   a dielectric cover;
   a sensing component configured to generate a measurement signal representing an amount of a commodity;
   a central processing unit (CPU) configured to receive the measurement signal and generate a corresponding communication signal;
   a transceiver coupled to the CPU and having an output port configured to provide an output signal including measurement data indicative of the communication signal; and
   an antenna system including an electric field source and an antenna element, the electric field source located within the dielectric cover and electrically connected to the output port of the transceiver for forming an electric field indicative of the output signal, the antenna element separated from the electric field source by and located external to the dielectric cover and configured to capacitively couple to the electric field source and radiate electromagnetic radiation indicative of the output signal,
   wherein the antenna element is a tuned structure comprised of a first antenna element and a second antenna element, wherein one end of the first antenna element capacitively couples in a coupling area with the electric field source and the other end of the first antenna element radiates electromagnetic radiation.

2. The meter of claim 1 wherein the antenna element radiates the electromagnetic radiation in a beam in one direction to increase a gain of the antenna.

3. The meter of claim 1 wherein the antenna element comprises an active resonator configured to absorb the electric field from the electric field source and radiate the electromagnetic radiation indicative thereof.

4. The meter of claim 1 wherein the first antenna element is longer than the second antenna element and wherein the second antenna element tunes the first antenna element to a desired frequency and provides a radiation pattern that complements the first antenna element in the radiation pattern.

5. The meter of claim 1 wherein a middle of the tuned structure is positioned at a bottom of the dielectric cover adjacent to the electric field source to form the coupling area for the electric field source and antenna element.

6. The meter of claim 1 wherein the electric field source is configured to transfer energy therefrom to the antenna element via an electric field in the coupling area, and wherein the coupling area has sufficient size to create the capacitive coupling between the electric field source and the antenna element.

7. The meter of claim 1 wherein the meter is an electrical meter, wherein the commodity is electricity, wherein the sensing component senses at least one of power, current, and voltage of the electricity, and wherein the measurement signal indicates at least one of watt-hours, amperes, and volts.

8. The meter of claim 1 wherein the electric field source comprises a plurality of metallic planar strips, wherein the antenna element comprises a plurality of metallic planar strips, wherein a width of the electric field source strips is substantially equal to a width of the antenna element strips, and wherein a length of the electric field source strips is less than a length of the antenna element strips.

9. An antenna system comprising:
   a dielectric substrate;
   a component configured to generate a signal;
   a central processing unit (CPU) configured to receive the signal and generate a corresponding communication signal;
   a transceiver coupled to the CPU and having an output port configured to provide an output signal including data indicative of the communication signal;
   an electric field source, the electric field source located within the dielectric substrate and electrically connected to the output port of the transceiver for forming an electric field indicative of the output signal; and
   an antenna element separated from the electric field source by and located external to the dielectric substrate and configured to radiate electromagnetic radiation indicative of the output signal, the antenna element comprising a first antenna element and a second antenna element, wherein one end of the first antenna element capacitively couples in a coupling area with the electric field source and the other end of the first antenna element radiates electromagnetic radiation, and wherein the second antenna element tunes the first antenna element to a predetermined frequency.

10. The antenna system of claim 9 wherein at least one of the following:
    the transceiver operates with a carrier frequency of between 450 and 470 megahertz;
    the transceiver transmits at a frequency of about 902 to 928 megahertz and receives at a frequency of about 902 to 928 megahertz;

the transceiver and antenna system operate centered at 460 MHz with a 20 MHz bandwidth; and the transceiver and antenna system operate centered at 915 MHz with a 23 MHz bandwidth.

11. The antenna system of claim 9 wherein the antenna element is capacitively coupled to the electric field source.

12. The antenna system of claim 9 wherein the electric field source comprises one or more metallic planar strips, wherein the antenna element comprises one or more metallic planar strips, wherein a width of the electric field source strips is substantially equal to a width of the antenna element strips, and wherein a length of the electric field source strips is less than a length of the antenna element strips.

13. The antenna system of claim 12 wherein the electric field source strips and the antenna element strips each comprise at least four sides and at least four substantially right angles, wherein adjacent sides are unequal.

14. The antenna system of claim 12 wherein a ratio of the width of the antenna element strips to the width of the electric field source strips is about 1:1.

15. The antenna system of claim 12 wherein a ratio of the length of the electric field source strips to the width thereof is about 2.6:1 to about 3.8:1 and wherein a ratio of the length of the antenna element strips to the width thereof is about 6.8:1 to about 18.4:1.

16. The antenna system of claim 12 wherein a ratio of the length of the antenna element strips to the length of the electric field source strips is about 1.79:1 to about 7.08:1.

17. The antenna system of claim 12 wherein a ratio of the length of the electric field source strips to a circumference of the dielectric cover is about 0.07:1 to about 0.1:1, and wherein a ratio of the length of the antenna element strips to the circumference of the dielectric cover is about 0.186:1 to about 0.504:1.

18. A method of manufacturing a replacement dielectric cover for a meter, comprising:

locating an electric field source on an inside surface of a replacement dielectric cover, wherein the electric field source comprises one or more metallic planar strips configured to be electrically coupled to an output port of a transceiver of the meter, and wherein the electric field source is configured to generate an electric field indicative of an output signal received from the output port, said output signal representing an amount of a commodity measured by the meter;

locating an antenna element on an outside surface of the replacement dielectric cover opposite the electric field source, wherein the antenna element comprises a plurality of metallic planar strips configured to capacitively couple to the electric field source and radiate electromagnetic radiation indicative of the output signal; and tuning, with one of the metallic planar strips, another one of the metallic planar strips to radiate at a desired frequency.

19. The method of claim 18, wherein a width of the metallic planar strips comprising the electric field source is substantially equal to a width of the metallic planar strips comprising the antenna element, and wherein a length of the metallic planar strips comprising the electric field source is less than a length of the metallic planar strips comprising the antenna element.

20. The method of claim 18, wherein a dielectric constant of the replacement dielectric cover is about 2.8 to about 3.4.

* * * * *